United States Patent
Ehrlemark (10) Patent No.: US 8,381,539 B2
(45) Date of Patent: Feb. 26, 2013

(54) METHOD AND CONTROL SYSTEM FOR DECREASING THE THERMAL LOAD ON ANIMALS

(75) Inventor: Anders Ehrlemark, Strangnas (SE)

(73) Assignee: DeLaval Holding AB, Tumba (SE)

( * ) Notice: Subject to any disclaimer, the term of this patent is extended or adjusted under 35 U.S.C. 154(b) by 931 days.

(21) Appl. No.: 12/443,507

(22) PCT Filed: Sep. 28, 2007

(86) PCT No.: PCT/SE2007/050690
§ 371 (c)(1),
(2), (4) Date: Mar. 30, 2009

(87) PCT Pub. No.: WO2008/039150
PCT Pub. Date: Apr. 3, 2008

(65) Prior Publication Data
US 2010/0096466 A1    Apr. 22, 2010

(30) Foreign Application Priority Data
Sep. 29, 2006 (SE) ...................................... 0602048

(51) Int. Cl.
*F25B 49/00* (2006.01)
(52) U.S. Cl. ....... 62/176.6; 62/176.1; 62/186; 236/44 A; 236/44 C; 236/49.3; 119/14.03; 119/516; 119/518; 119/520
(58) Field of Classification Search ................ 236/44 A, 236/44 C, 49.3; 62/176.1, 176.6, 186; 119/14.03, 119/516, 518, 520
See application file for complete search history.

(56) References Cited

U.S. PATENT DOCUMENTS

| | | | |
|---|---|---|---|
| 3,677,229 A * | 7/1972 | Blough et al. ................ | 119/448 |
| 4,476,809 A | 10/1984 | Bunger | |
| 4,693,852 A | 9/1987 | Gordon | |
| 4,700,887 A * | 10/1987 | Timmons ..................... | 236/49.3 |
| 5,107,792 A * | 4/1992 | Bugl et al. .................... | 119/448 |
| 5,125,571 A * | 6/1992 | Heber .......................... | 236/49.3 |
| 5,813,599 A * | 9/1998 | Hoff ............................ | 236/49.3 |
| 6,079,360 A | 6/2000 | Birk | |
| 7,026,939 B2 * | 4/2006 | Letkomiller et al. ....... | 340/572.7 |
| 2003/0061996 A1* | 4/2003 | Voogd et al. ............... | 119/51.02 |
| 2003/0064677 A1* | 4/2003 | Terrell et al. ................. | 454/337 |
| 2006/0161305 A1* | 7/2006 | Jung, II ........................ | 700/276 |
| 2006/0180093 A1* | 8/2006 | Cross et al. .................. | 119/720 |
| 2007/0093965 A1* | 4/2007 | Harrison et al. ............. | 702/19 |

FOREIGN PATENT DOCUMENTS

| | | |
|---|---|---|
| EP | 0067979 | 12/1982 |
| EP | 1119237 | 8/2001 |
| EP | 1230850 | 8/2002 |
| GB | 2091453 A  * | 7/1982 |
| WO | 0110197 | 2/2001 |
| WO | 2005082134 | 9/2005 |

OTHER PUBLICATIONS

International Search Report dated Jan. 3, 2008, in PCT application.

* cited by examiner

*Primary Examiner* — Cheryl J Tyler
*Assistant Examiner* — Jonathan Bradford
(74) *Attorney, Agent, or Firm* — Young & Thompson (57) ABSTRACT

A method of controlling a cooling element in order to decrease the thermal load on animals includes the step: —to start the cooling element when the air temperature exceeds a predetermined threshold value and/or a parameter, dependent on the relative humidity of air, exceeds a predetermined threshold value.

23 Claims, 10 Drawing Sheets

Fig. 1

| Air temp C | Relative humidity | | | | | | | | | | | | | | | | | |
|---|---|---|---|---|---|---|---|---|---|---|---|---|---|---|---|---|---|---|
| | 20% | 25% | 30% | 35% | 40% | 45% | 50% | 55% | 60% | 65% | 70% | 75% | 80% | 85% | 90% | 95% | 100% |
| 20 | 64 | 64 | 64 | 64 | 65 | 65 | 65 | 66 | 66 | 66 | 66 | 67 | 67 | 67 | 68 | 68 | 68 |
| 21 | 65 | 65 | 65 | 66 | 66 | 66 | 67 | 67 | 67 | 68 | 68 | 68 | 69 | 69 | 69 | 70 | 70 |
| 22 | 66 | 66 | 66 | 67 | 67 | 67 | 68 | 68 | 69 | 69 | 69 | 70 | 70 | 71 | 71 | 71 | 72 |
| 23 | 67 | 67 | 67 | 68 | 68 | 69 | 69 | 70 | 70 | 70 | 71 | 71 | 72 | 72 | 73 | 73 | 74 |
| 24 | 68 | 68 | 69 | 69 | 69 | 70 | 70 | 71 | 71 | 72 | 72 | 73 | 73 | 74 | 74 | 75 | 75 |
| 25 | 69 | 69 | 70 | 70 | 71 | 71 | 72 | 72 | 73 | 73 | 74 | 74 | 75 | 75 | 76 | 77 | 77 |
| 26 | 70 | 70 | 71 | 71 | 72 | 72 | 73 | 74 | 74 | 75 | 75 | 76 | 77 | 77 | 78 | 78 | 79 |
| 27 | 71 | 71 | 72 | 72 | 73 | 74 | 74 | 75 | 76 | 76 | 77 | 78 | 78 | 79 | 79 | 80 | 81 |
| 28 | 72 | 72 | 73 | 74 | 74 | 75 | 76 | 76 | 77 | 78 | 78 | 79 | 80 | 80 | 81 | 82 | 83 |
| 29 | 73 | 73 | 74 | 75 | 75 | 76 | 77 | 78 | 78 | 79 | 80 | 81 | 81 | 82 | 83 | 84 | 84 |
| 30 | 74 | 74 | 75 | 76 | 77 | 77 | 78 | 79 | 80 | 81 | 81 | 82 | 83 | 84 | 85 | 85 | 85 |
| 31 | 75 | 75 | 76 | 77 | 78 | 79 | 80 | 80 | 81 | 82 | 83 | 84 | 85 | 85 | 86 | 87 | 88 |
| 32 | 76 | 76 | 77 | 78 | 79 | 80 | 81 | 82 | 83 | 84 | 84 | 85 | 86 | 87 | 88 | 89 | 90 |
| 33 | 77 | 77 | 78 | 79 | 80 | 81 | 82 | 83 | 84 | 85 | 86 | 87 | 88 | 89 | 90 | 91 | 92 |
| 34 | 78 | 79 | 80 | 80 | 81 | 82 | 83 | 84 | 85 | 86 | 87 | 88 | 89 | 90 | 91 | 92 | 93 |
| 35 | 79 | 80 | 81 | 82 | 83 | 84 | 85 | 86 | 87 | 88 | 89 | 90 | 91 | 92 | 93 | 94 | 95 |
| 36 | 80 | 81 | 82 | 83 | 84 | 85 | 86 | 87 | 88 | 89 | 90 | 91 | 93 | 94 | 95 | 96 | 97 |
| 37 | 81 | 82 | 83 | 84 | 85 | 86 | 87 | 88 | 90 | 91 | 92 | 93 | 94 | 95 | 96 | 98 | 99 |
| 38 | 82 | 83 | 84 | 85 | 86 | 87 | 89 | 90 | 91 | 92 | 93 | 95 | 96 | 97 | 98 | 99 | 101 |
| 39 | 83 | 84 | 85 | 86 | 87 | 88 | 90 | 91 | 92 | 94 | 95 | 96 | 97 | 99 | 100 | 101 | 102 |
| 40 | 84 | 85 | 86 | 87 | 89 | 90 | 91 | 93 | 94 | 95 | 96 | 98 | 99 | 100 | 102 | 103 | 104 |

METHOD AND CONTROL SYSTEM FOR DECREASING THE THERMAL LOAD ON ANIMALS

FIELD OF THE INVENTION

The present invention relates, in a first aspect, to a method of controlling a cooling means in order to decrease the thermal load on animals.

According to a second aspect, the present invention relates to a control system operable to decrease the thermal load on animals.

According to a third aspect, the present invention relates to at least one computer program product for decreasing the thermal load on animals.

BACKGROUND OF THE INVENTION

The patent document U.S. Pat. No. 4,693,852 discloses a cooling apparatus for cooling animals. The apparatus creates a cool microclimate at the skin and fur of an animal by directing a flow of evaporatively cooled air over the animal and by wetting the coat of the animal. Therefore the apparatus comprises a ventilator and nozzles for injecting water droplets into the air flowing through said apparatus.

A disadvantage with this known apparatus is that the airflow is only used for transporting the water droplets. Another disadvantage with this known apparatus is that it is not designed for eliminating acute heat stress and heat stress during a long time period for animals.

The patent document U.S. Pat. No. 6,079,360 describes a milking stall for housing an animal to be subjected to an animal-related action, comprising an enclosure defining a space, and having at least one passage permitting the animal to enter the space. In order to attract the animal and make it feel comfortable, there is provided a conditioning device having an air delivery apparatus adapted to produce an air flow at least to the space.

A main disadvantage with this known milking stall is that it is not designed for eliminating acute heat stress and heat stress during a long time period for so animals.

The patent document EP-B1-1 119 237 relates to a method of cooling animals, such as cows, whereby a liquid is applied between the hairs and/or on the skin of the animal, and wherein air is blown over the liquid. This document also mentions different ways of ascertaining heat stress of the animals to be cooled, e.g. on the basis of an infrared picture of the animal. Another way of ascertaining heat stress is based on the position of the animals' ears.

A main disadvantage with this known method is that the animals will experience heat stress before they are being cooled.

SUMMARY OF THE INVENTION

The above mentioned problems are solved by a method of controlling a cooling means in order to decrease the thermal load on animals. The main advantage with the method according to the present invention is that it eliminates the acute heat stress and the heat stress during a long time period for animals. With this method, the climate is controlled before the animals probably will experience any form of heat stress. This will have an advantageous impact on the production of milk for e.g. milking cows.

The above mentioned problems are also solved by a control system operable to decrease the thermal load on animals. The main advantage with the control system according to the present invention is that it eliminates the acute heat stress and the heat stress during a long time period for animals. With this control system, it will be guaranteed that the climate in the stable/barn, locally or as a whole, is pleasant for the animals and the animals will probably not experience any form of heat stress. This will have an advantageous impact on the production of milk for e.g. milking cows.

The above mentioned problems are also be solved by a computer program product in accordance with the invention. The at least one computer program product is/are directly loadable into the internal memory of at least one digital computer. The at least one computer program product comprises software code portions for performing the step of the method according to the present invention, when the at least one product is/are run on the at least one computer. The main advantage with the at least one computer program product, when performing the step/steps according to the present invention is that it/they eliminates/eliminate the acute heat stress and the heat stress during a long time period for animals. With this computer program product, the climate is controlled before the animals probably will experience any form of heat stress. This will have an advantageous impact on the production of milk for e.g. milking cows.

It will be noted that the term "comprises/comprising" as used in this description is intended to denote the presence of a given characteristic, step or component, without excluding the presence of one or more other characteristic features, integers, steps, components or groups thereof.

Embodiments of the invention will now be described with a reference to the accompanying drawings, in which:

DETAILED DESCRIPTION OF PREFERRED EMBODIMENTS

Figure 1:
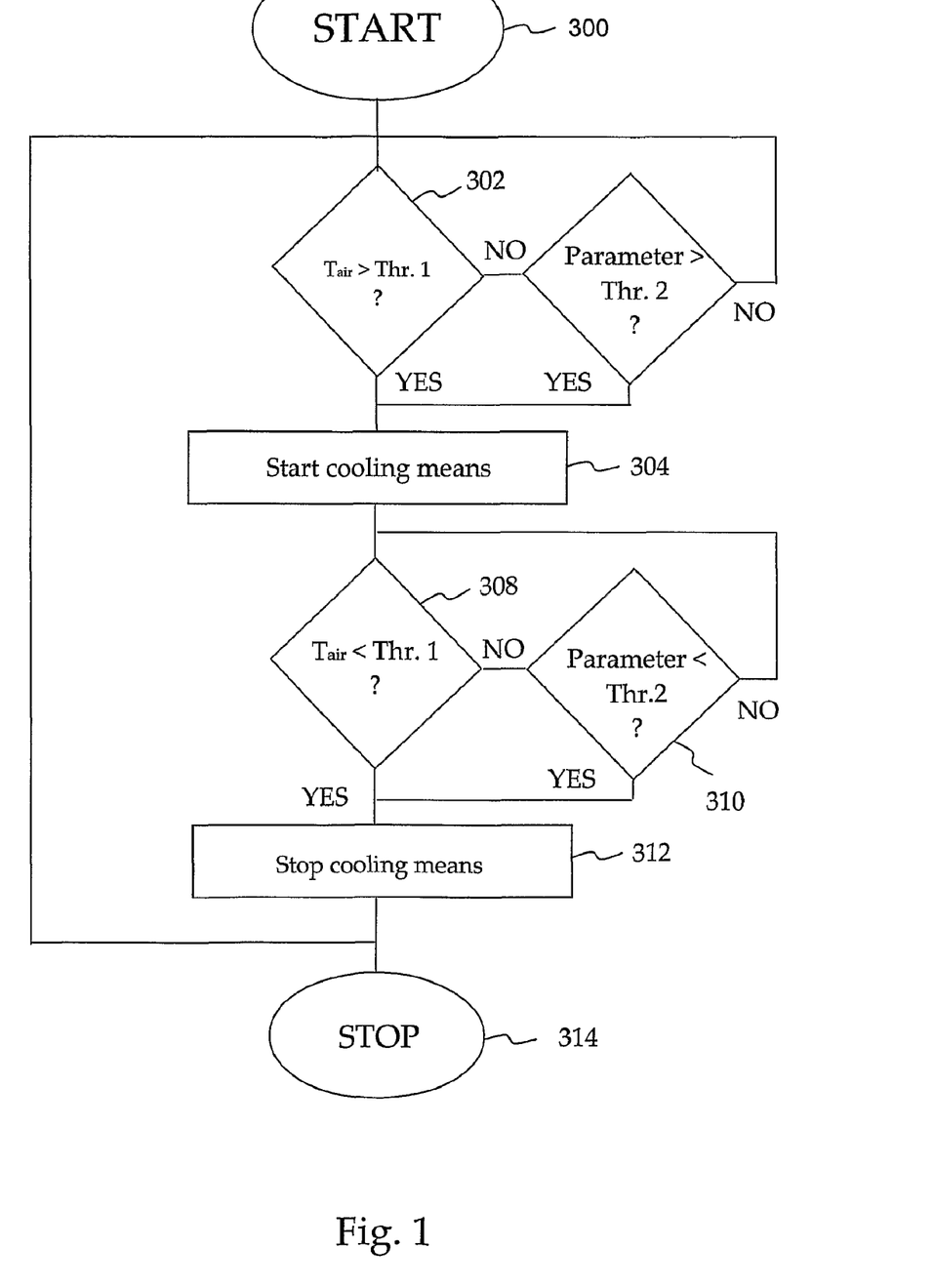
FIG. 1 is a flow chart of the method of controlling a cooling means in order to decrease the thermal load on animals according to the present invention.

In FIG. 1 there is disclosed a flow chart of the method of controlling a cooling means in order to decrease the thermal load on animals according to the present invention. The method begins at block 300. Thereafter, the method continues, at block 302, to ask the question: Is the air temperature greater than a predetermined threshold value? If the answer to this question is affirmative, then the method continues, at block 304, with the step: to start the cooling means. If, on the other hand, the answer to the question asked in block 302 is negative, the method continues, at block 306, to ask the question: Is a parameter, dependent on the air temperature and the relative humidity of air greater than a predetermined threshold value? If the answer to this question is affirmative, then the method continues, at block 304, with the step: to start the cooling means. If, on the other hand, the answer to the question asked in block 306 is negative, the method continues with block 302 again. Once the cooling means has been started, in accordance with block 304, the method continues, at block 308, to ask the question: Is the air temperature less than the predetermined threshold value? If the answer to this question is affirmative, then the method continues, at block 312, with the step: to stop the cooling means. If, on the other hand, the answer to the question asked in block 308 is negative, the method continues, at block 310, to ask the question: Is the parameter less than the predetermined threshold value? If the answer to this question is affirmative, then the method continues, at block 312, with the step: to stop the cooling means. If, on the other hand, the answer to the question asked in block 310 is negative, the method continues with block 308 again. As long as the controlling method disclosed in FIG. 1 is active, the method, after block 312, continues with block 302 again. When the method is not active, it is completed at block 314.

It is noted that it is also possible that the parameter is only dependent on the relative humidity of air, instead of both the air temperature and the relative humidity of air.

According to one preferred embodiment of the method, it also comprises the step: to start the cooling means when the means value during twenty-four hours of the parameter exceeds a predetermined threshold value.

According to another preferred embodiment of the method, it also comprises the step: to stop the cooling means when the mean value during twenty-four hours of the parameter is less than the predetermined threshold value.

Preferably, the cooling means is a cooling fan and/or an evaporative cooling means.

In yet another preferred embodiment of the method it also comprises the steps:
  to identify an individual animal with the aid of an identification means worn by said animal;
  to sense the temperature of the skin and/or the body and/or the ambient temperature in the vicinity of said identified animal; and
  to control said cooling means in dependence of said sensed temperature.

In yet another preferred embodiment of the method, it also comprises the step:
  to measure the speed of air at said cooling fan with the aid of an air speed measuring means; and
  to adjust said air speed in dependence of said sensed temperature of the skin and/or the body and/or the ambient temperature in the vicinity of said identified animal.

In yet another preferred embodiment of the method, it also comprises the step:
  to activate the cooling means when an animal is present in a milking parlour or a feeding parlour or a milking box or a feeding box or a resting area or an alley.

According to another preferred embodiment of the method, the parameter is a Temperature Humidity Index (THI).

In yet another preferred embodiment of the method, it also comprises the step:
  to calculate the Temperature Humidity Index in accordance with the expression:

$$THI=0.8*T_{air}+(RH\%/100)*(T_{air}-14.3)+46.4,$$

wherein $T_{air}$ is the air temperature, and RH % is the relative humidity of air expressed in %.

It is to be noted that the above given expression is only one possible way of calculating the Temperature Humidity Index (THI).

In yet another preferred embodiment of the method, it also comprises the step: to measure the air temperature continuously with a first time interval between consecutive measurements of the air temperature.

According to another preferred embodiment of the method, it also comprises the step: to update the mean value during twenty-four hours of the parameter continuously with a second time interval between consecutive updatings of the parameter.

In yet another preferred embodiment of the method, the second time interval is greater than the first time interval.

According to another preferred embodiment of the method, the first time interval is 1-5 minutes.

In yet another preferred embodiment of the method, the second time interval is 15-30 minutes.

According to another preferred embodiment of the method, the predetermined threshold value of the air temperature is in the range of 25-35° C. preferably in the range of 28-32° C.

In yet another preferred embodiment of the method, the predetermined threshold value of the Temperature Humidity Index (THI) is in the range of 68-74.

According to another preferred embodiment of the method, the predetermined threshold value of the mean value during twenty-four hours of the Temperature Humidity Index (THI 24 hr) is in the range of 68-74.

In yet another preferred embodiment of the method, it also comprises the step: to measure the effect of the method by measuring the heat loss with the aid of a sensor means.

According to another preferred embodiment of the method, it also comprises the step:
  to calculate the effect of the method by using a simulation model, based on the transfer of latent and sensible heat between an animal and its environment.

Figure 2:
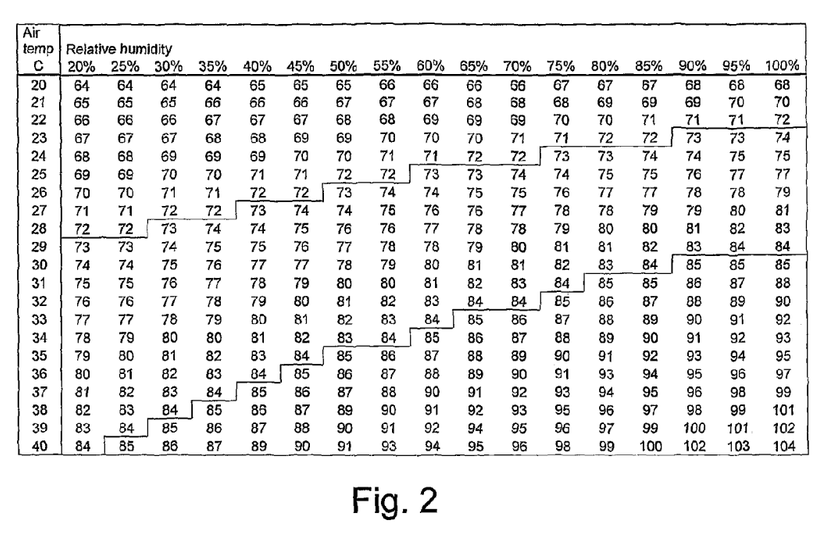
FIG. 2 is a table disclosing the Temperature Humidity Index (THI) in dependence of the air temperature and the relative humidity of air.

In FIG. 2 there is disclosed a table showing the Temperature humidity Index (THI) in dependence of the air temperature and the relative humidity of air.

Figure 3:
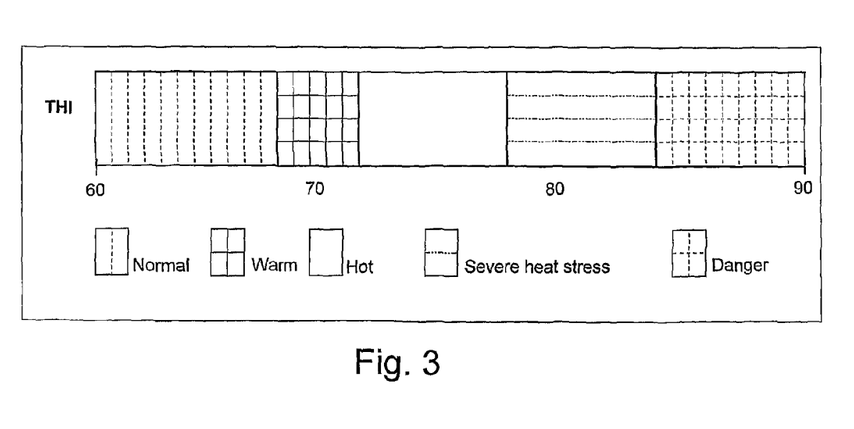
FIG. 3 is a schematic representation of the impact of the Temperature Humidity Index on e.g. a cow.

In FIG. 3 there is disclosed a schematic representation of the impact of the Temperature Humidity Index on e.g. a cow.

Based on trials and experience, FIG. 3 discloses the impact of heat stress on the production of milk. In the interval 68-72, there are trials which show a decrease in the production of milk.

Figure 4:
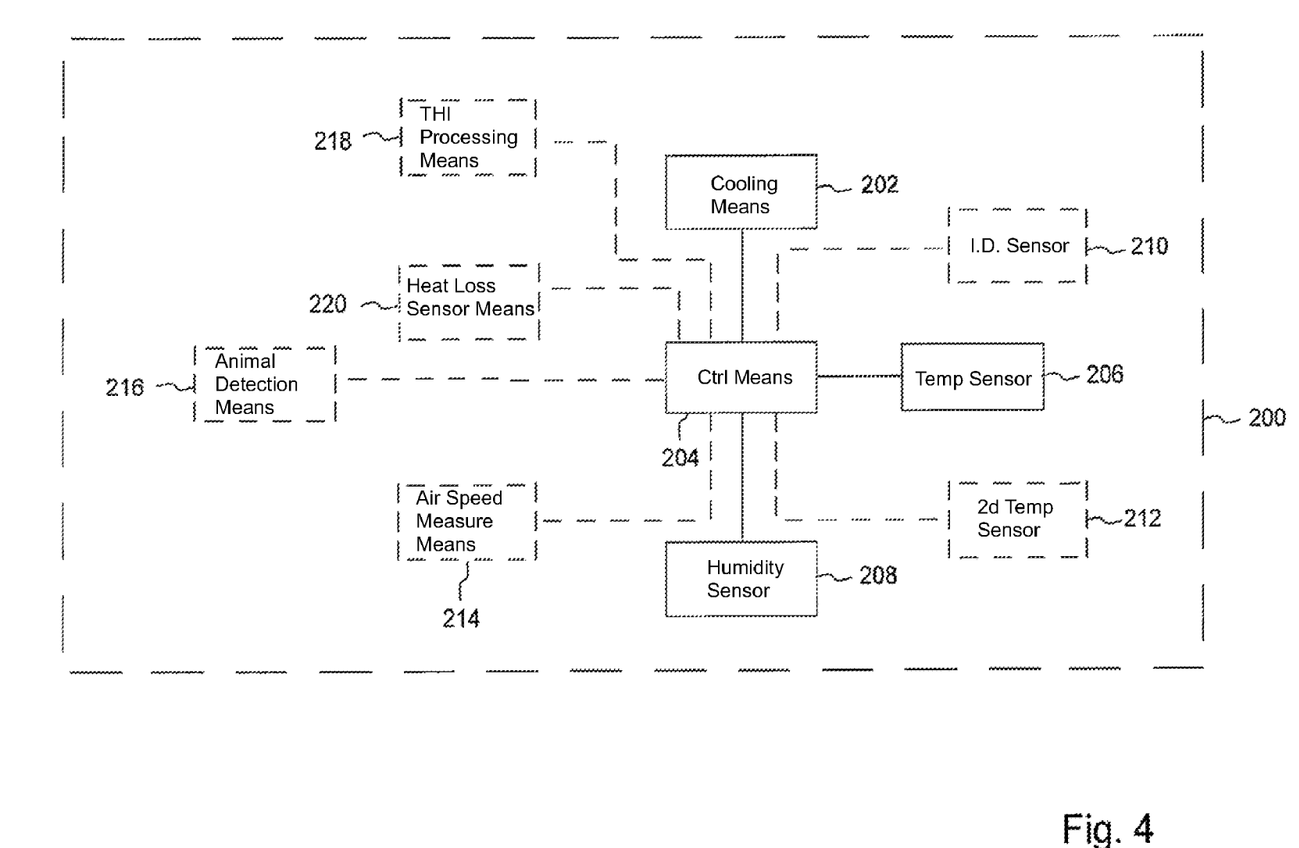
FIG. 4 shows a block diagram of a control system operable to decrease the thermal load on animals according to the present invention.

In FIG. 4 there is disclosed a block diagram of a control system 200 operable to decrease the thermal load on animals according to the present invention. The control system 200 comprises a cooling means 202 operable to cool animals. The control system 200 also comprises a control means 204 connected to the cooling means 202. Furthermore, the control system 200 also comprises a temperature sensor 206 connected to the control means 204 operable to measure the air temperature ($T_{air}$). As also is apparent in FIG. 4, the control system 200 also comprises a humidity sensor 208 connected to the control means 204 operable to measure the relative humidity of air. The control means 204 is operable to start the cooling means 202 when the temperature sensor 206 measures an air temperature ($T_{air}$) exceeding a predetermined threshold value and/or when a parameter, depending on the air temperature and the relative humidity of air, exceeds a predetermined threshold value. The control means 204 is also operable to stop the cooling means 202 when the temperature sensor 206 measures an air temperature which is less than the predetermined threshold value and/or when the parameter is less than the predetermined threshold value.

It is noted that it is also possible that the parameter is only dependent on the relative humidity of air, instead of both the air temperature and the relative humidity of air.

The temperature sensor 206 can also be operable to measure the air temperature repeatedly and continuously. The humidity sensor 208 can also be operable to measure the relative humidity of air repeatedly and continuously.

The control means 204 can also be operable to start the cooling means 202 when the mean value during twenty-four hours of the parameter exceeds a predetermined threshold value. The control means 204 is also operable to stop the cooling means 202 when the means value during twenty-four hours of the parameter is less than the predetermined threshold value.

As also is apparent in FIG. 4, the control system 200 can also comprise a identification sensor 210 connected to the control means 204 (disclosed with dotted lines) operable to identify an individual animal with the aid of an identification means worn by the animal. The control system 200 can also comprise a second temperature sensor 212 connected to the control means 204 operable to sense the temperature of the skin and/or the body and/or the ambient temperature in the vicinity of the identified animal. The control means 204 is also operable to control the cooling means 202 in dependence of the sensed temperature.

According to another preferred embodiment of the control system 200, it can also comprise a air speed measuring means 214 connected to the control means 204 operable to measure the speed of air at the cooling fan 202 (when the cooling means 202 is a cooling fan). The control means 204 is operable to adjust the air speed from the cooling fan 202 in dependence of the sensed temperature of the skin and/or the body and/or the ambient temperature in the vicinity of the identified animal.

According to another preferred embodiment of the control system 200, it also comprises a animal detection means 216 connected to the control means 204. The control means 204 is also operable to activate the cooling means 202 when the animal detection means 216 has detected that an animal is present in a milking parlour or a feeding parlour or a milking box or a feeding box or a resting area or an alley.

In yet another preferred embodiment of the control system 200, it also comprises a processing means 218 connected to the control means 204. The parameter is a Temperature Humidity Index (THI) which is calculated by the processing means 218 in accordance with the expression:

$$THI=0.8*T_{air}+(RH\%/100)*(T_{air}-14.3)+46.4,$$

wherein $T_{air}$ is the air temperature, and RH % is the relative humidity of air expressed in %.

It is to be noted that the above given expression, is only one possible example of calculating the Temperature Humidity Index (THI).

According to another preferred embodiment of the control system 200, the temperature sensor 206 measures the air temperature continuously with a first time interval between consecutive measurements of the air temperature.

In yet another embodiment of the control system 200, the processing means 218 updates the mean value during twenty-four hours of the Temperature Humidity Index (THI) continuously with a second time interval between consecutive updatings of the Temperature Humidity Index (THI).

According to another preferred embodiment of the control system 200, the second time interval is greater than the first time interval.

Preferably, the first time interval is 1-5 minutes.

The second time interval is preferably 15-30 minutes.

According to another preferred embodiment of the control system 200, the predetermined threshold value of the air temperature is in the range of 25-35° C. preferably in the range of 28-32° C.

In yet another preferred embodiment of the control system 200, the predetermined threshold value of the Temperature Humidity Index (THI) is in the range of 68-74.

According to another preferred embodiment of the control system 200, the predetermined threshold value of the mean value during twenty-four hours of the Temperature Humidity Index (THI 24 hr) is in the range of 68-74.

In yet another preferred embodiment of the control system 200, it also can comprise a to the control means 204 connected sensor means 220 operable to measure the effect of the decreasing of the thermal load on animals by measuring the heat loss.

According to another preferred embodiment of the control system 200, the processing means 218 also is operable to calculate the effect of the decreasing of the thermal load on animals by using a simulation model, based on the transfer of latent and sensible heat between an animal and its environment.

Figure 5:
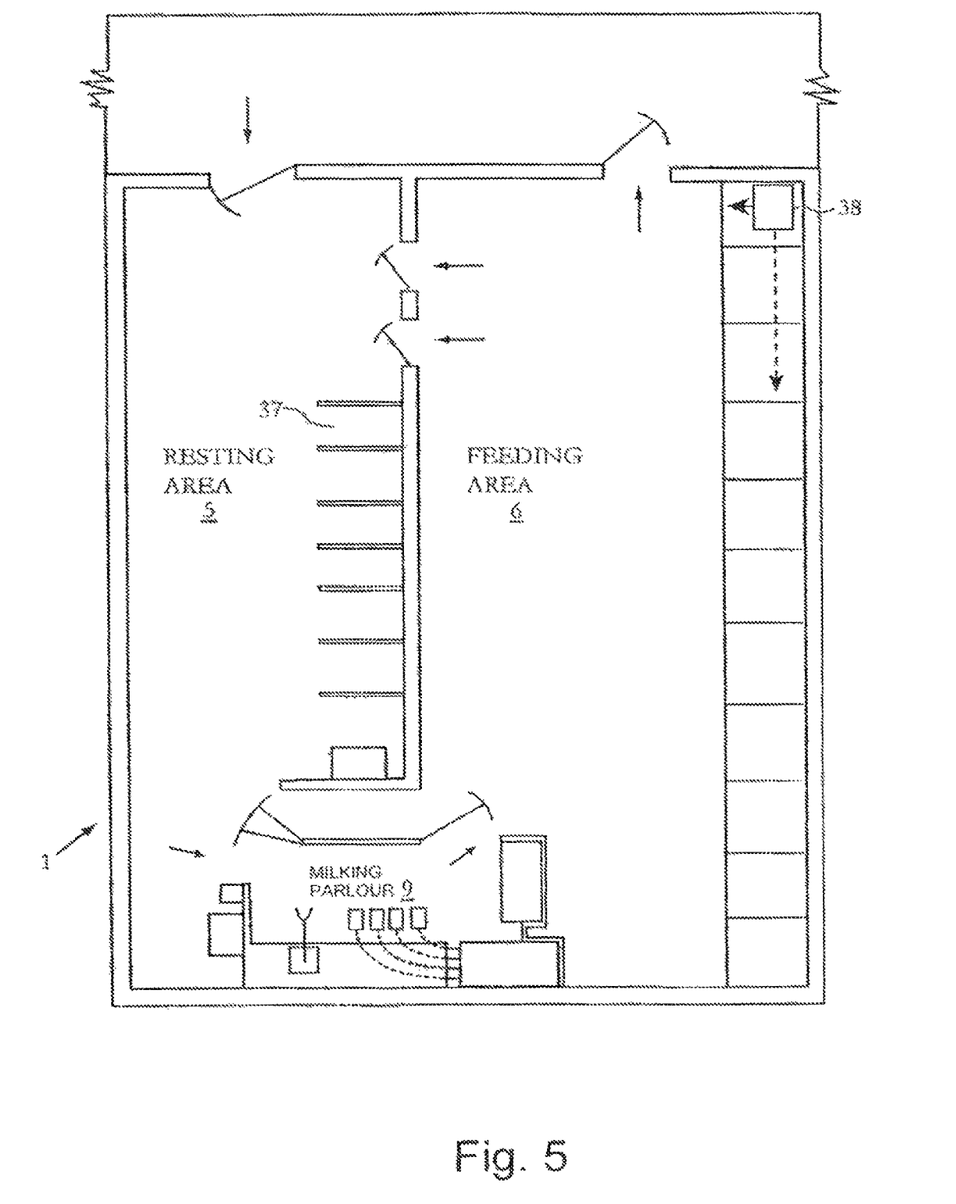
FIG. 5 discloses schematically a so called "loose-house layout" of an animal arrangement for housing a herd of cows including a milking station for automatic milking.

In FIG. 5 there is schematically disclosed a so called "loose-house layout" of an animal arrangement for housing a herd of cows including a milking station for automatic milking. The different layouts of animal arrangement disclosed in FIG. 5-9 are only examples of environments wherein the present invention can be implemented. Turning now again to FIG. 5, the arrangement comprises a stable 1, which is divided into a resting area 5, and a feeding area 6. The resting area 5 houses a number of resting stalls 37. The feeding area 6 houses an automatic feeding device in the form of a feed wagon 38. In the stable 1, there is also provided a milking station or parlour 9 arranged for voluntary milking of the freely walking cows, i.e. the cows enter the milking station 9 in order to be milked.

Figure 6:
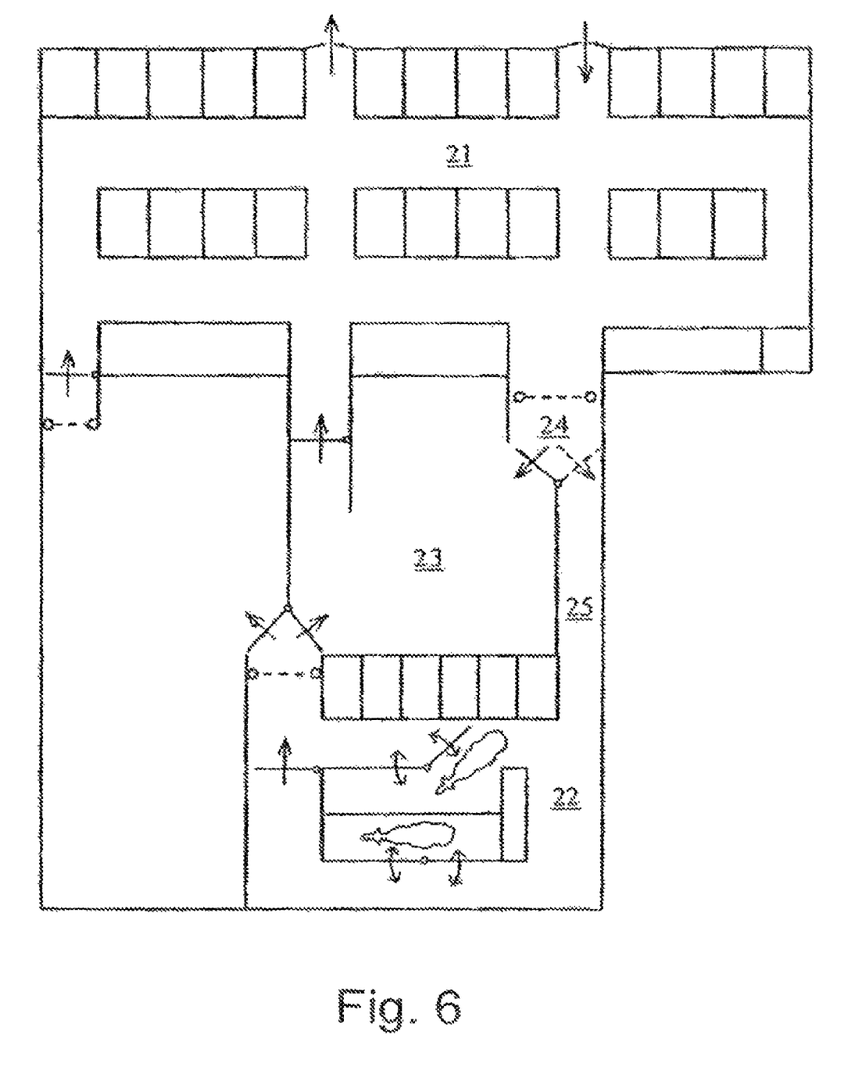
FIG. 6 discloses schematically another layout of an animal arrangement for housing a herd of cows including a milking station for automatic milking.

In FIG. 6 there is schematically disclosed another layout of an animal arrangement for housing a herd of cows including a milking station for automatic milking. The area 21 is a combined resting area and feeding area, only comprising roughage. The area 23 is an area for feeding of concentrated fodder. At 24 there is disclosed a selection gate. If a cow has permission to be milked, the cow is led through the way 25 to the automatic milking area 22. Otherwise the cow is led to the feeding area 23.

Figure 7:
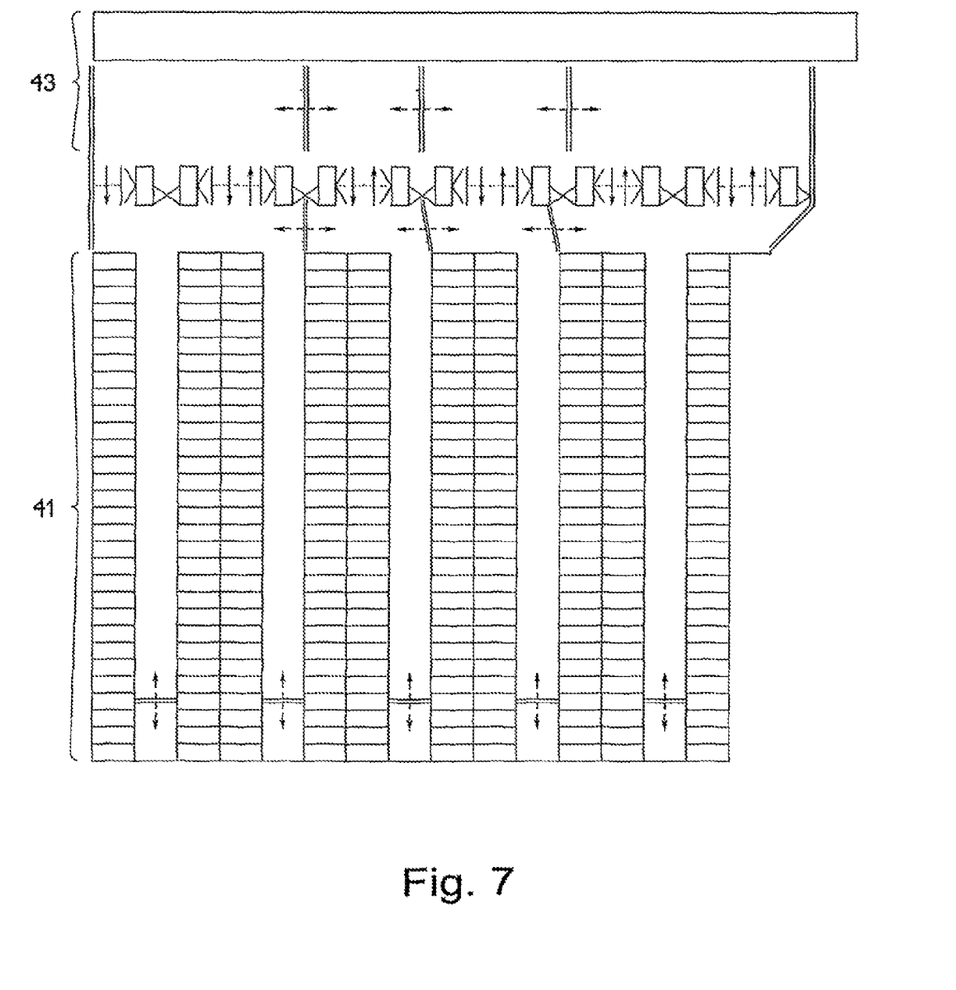
FIG. 7 discloses schematically yet another lay-out of an animal arrangement for housing a herd of cows including a number of milking stations for automatic milking.

In FIG. 7 there is schematically disclosed yet another layout of an animal arrangement for housing a herd of cows including a number of milking stations for automatic milking. The reference number 43 designates a feeding area, and 41 designates a resting area, wherein a row of milking stations is arranged.

Figure 8:
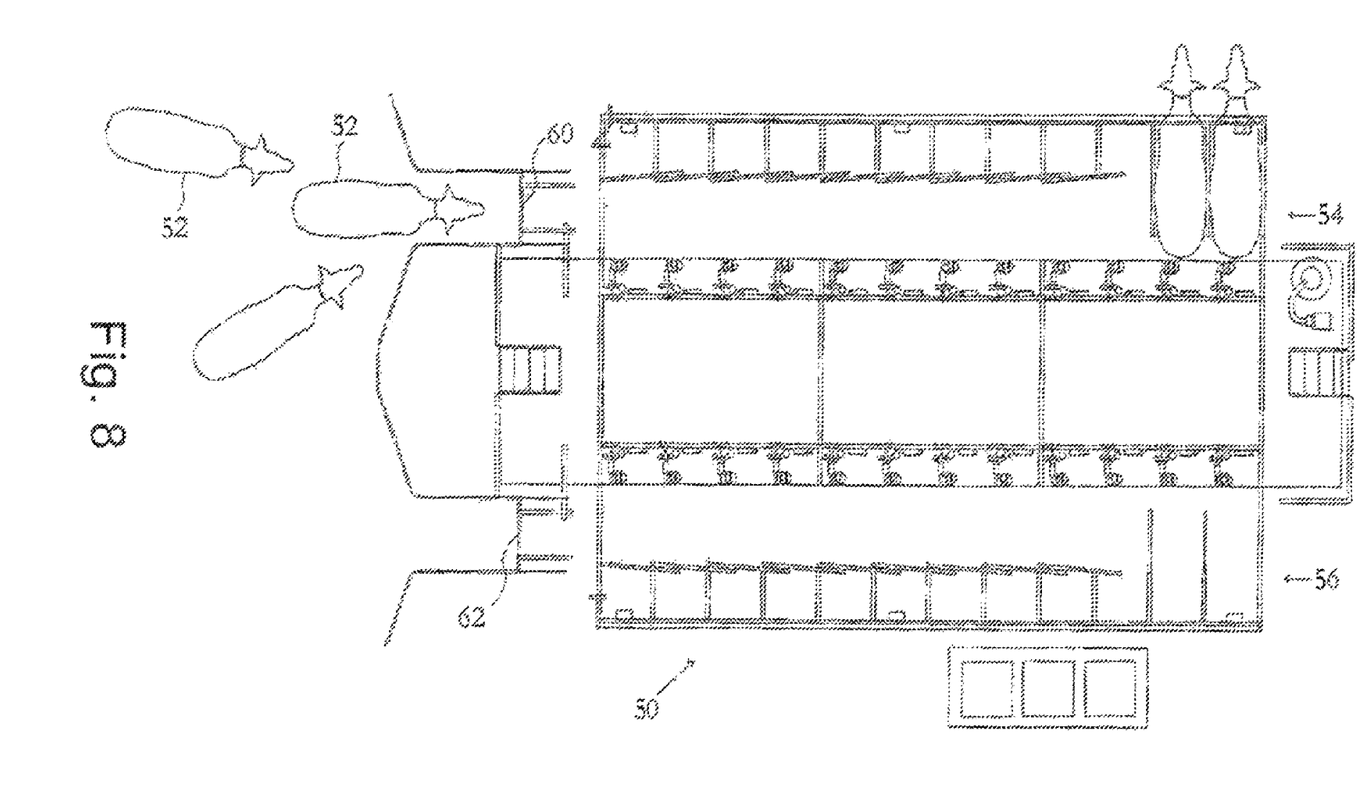
FIG. 8 is a schematic top plan view of a parallel stall milking parlour.

In FIG. 8 there is disclosed a schematic top plan view of a parallel stall milking parlour 50, including a first row of parallel milking stalls 54, and a second row of parallel milking stalls 56. Each of the rows 54, 56 is provided with a cow identification station 60, 62, through which the cows 52 can pass serially while being identified.

Figure 9:
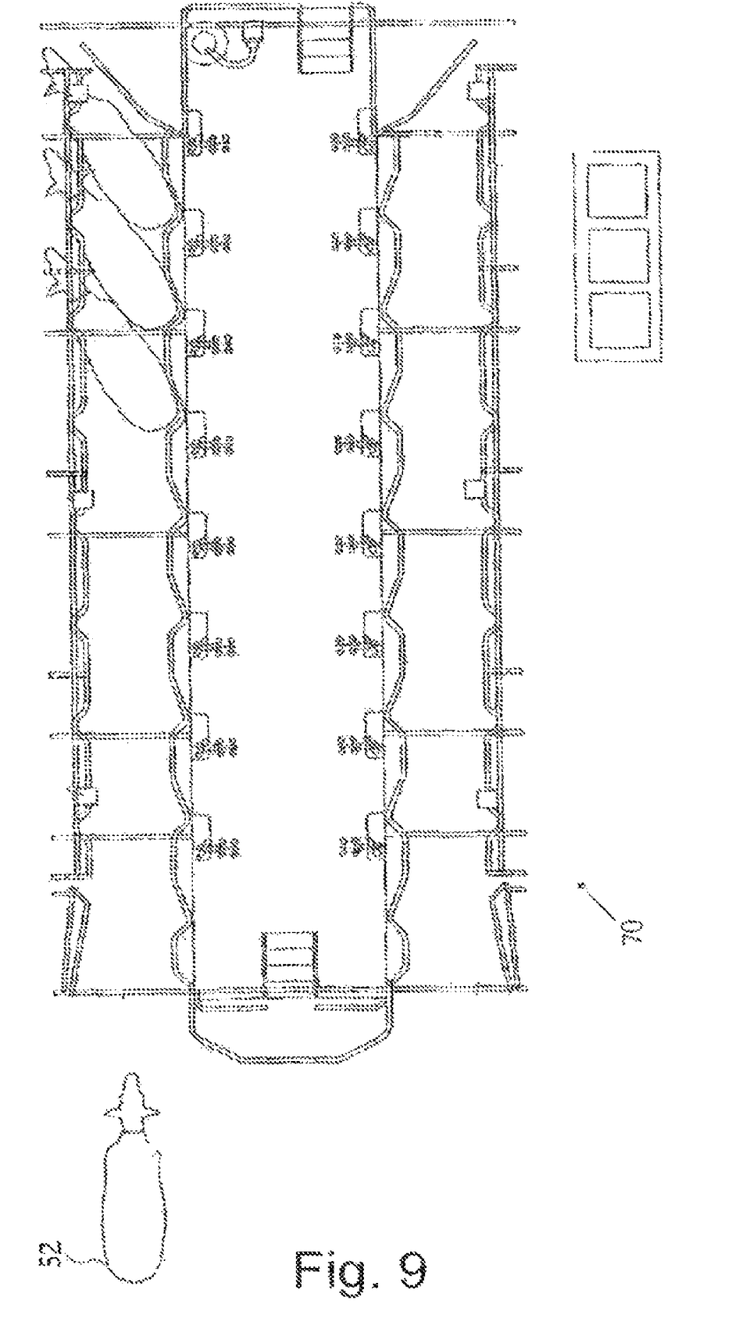
FIG. 9 is a schematic top plan view of a milking parlour in a herringbone configuration.

In FIG. 9 there is disclosed a schematic top plan view of a milking parlour 70 in a herringbone configuration, also comprising two rows of stalls, each including eight stalls.

In general, the cooling means are placed in the stable/barn.

In order to create a pleasant climate in the stable/barn, the sensor means are placed such that the values of the respective sensor means are representative for the stable/barn.

When preferring a more local control of the climate in the stable/barn, the sensor means and the cooling means are placed in an area that houses one or several animals at a time, such as in a resting area/parlour or a meeting area/parlour.

When preferring an almost individual control of the climate in the stable/barn, the sensor means and the cooling means are placed in an area arranged to place one animal at a time.

Furthermore, if the identity of the animal is known, it is possible to keep a record regarding each animal.

The impact of heat stress on an animal depends on how long time the climate has been warm. Acute heat stress results inter alia in that the animal is trying to increase the emitting of heat by perspiration from the skin and by quick gasps which give rise to cooling by evaporation of humidity from the lungs and the mucous membranes of the airway. After a while, an adaption to the warm climate happens by the decreasing of the appetite and the intake of nutrient which in turn leads to a lower metabolism and thereby the heat production of the animal is lowered. Regarding milking cows, unfortunately this leads to a decrease in the production of milk.

If the acute heat stress is so substantial that the natural cooling mechanism of the animal is insufficient, the body temperature will rise, which in extreme cases will lead to the death of the animal.

With the present invention it is possible to diminish the probability that the animals will experience any form of heat stress.

Figure 10:
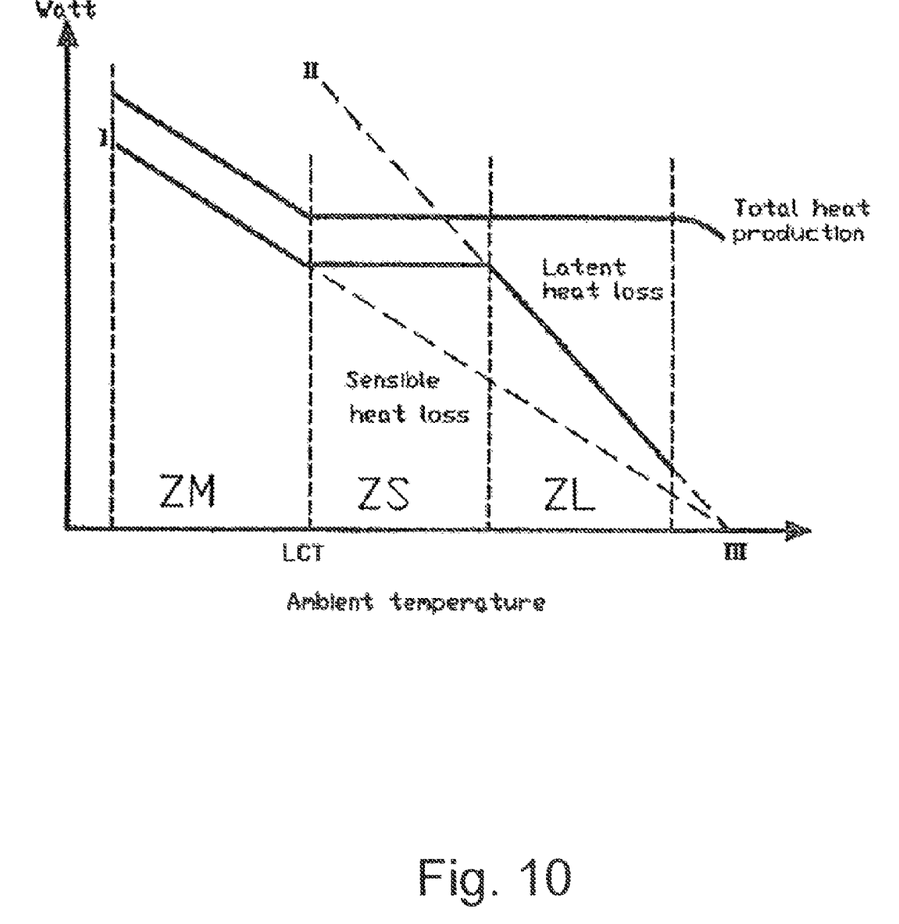
FIG. 10 is a schematic diagram showing total heat production and sensible heat loss in relation to ambient temperature in accordance with the ANIBAL-model.

In FIG. 10 here is disclosed a schematic diagram showing total heat production and sensible heat loss in relation to ambient temperature in accordance with the so called ANIBAL simulation model. In FIG. 10, ZM, ZS and ZL are different control zones separated by vertical dotted lines. FIG. 10 is a schematic description of the basic assumptions regarding the thermoregulatory system. The upper solid line shows total heat production which is assumed to be constant in the thermoneutral zone and sufficient to maintain homeostasis at temperatures below the lower critical temperature (LCT). Line I-III shows the rate of sensible heat loss with minimal body conductance. The lower solid line shows the assumed rate of sensible heat loss. The distance between the lower and upper solid line corresponds to the rate of latent heat loss required to maintain heat balance.

The mode of thermoregulatory control is assumed to depend on ambient temperature. The three different "control zones" are shown in FIG. 10:

ZM Zone with Metabolic heat control. Body conductance is constant and minimal. Latent heat loss is constant and minimal. Heat balance is maintained through metabolic control of the total heat production. The upper temperature limit of ZM is the lower critical temperature.

ZS Zone with Sensible heat control. Total heat production is constant. Latent heat loss is minimal. Heat balance is maintained through control of body conductance.

ZL Zone with latent heat control. Heat production is constant. Body conductance is constant and maximal. Heat balance is maintained through control of latent heal loss.

Figure 11:
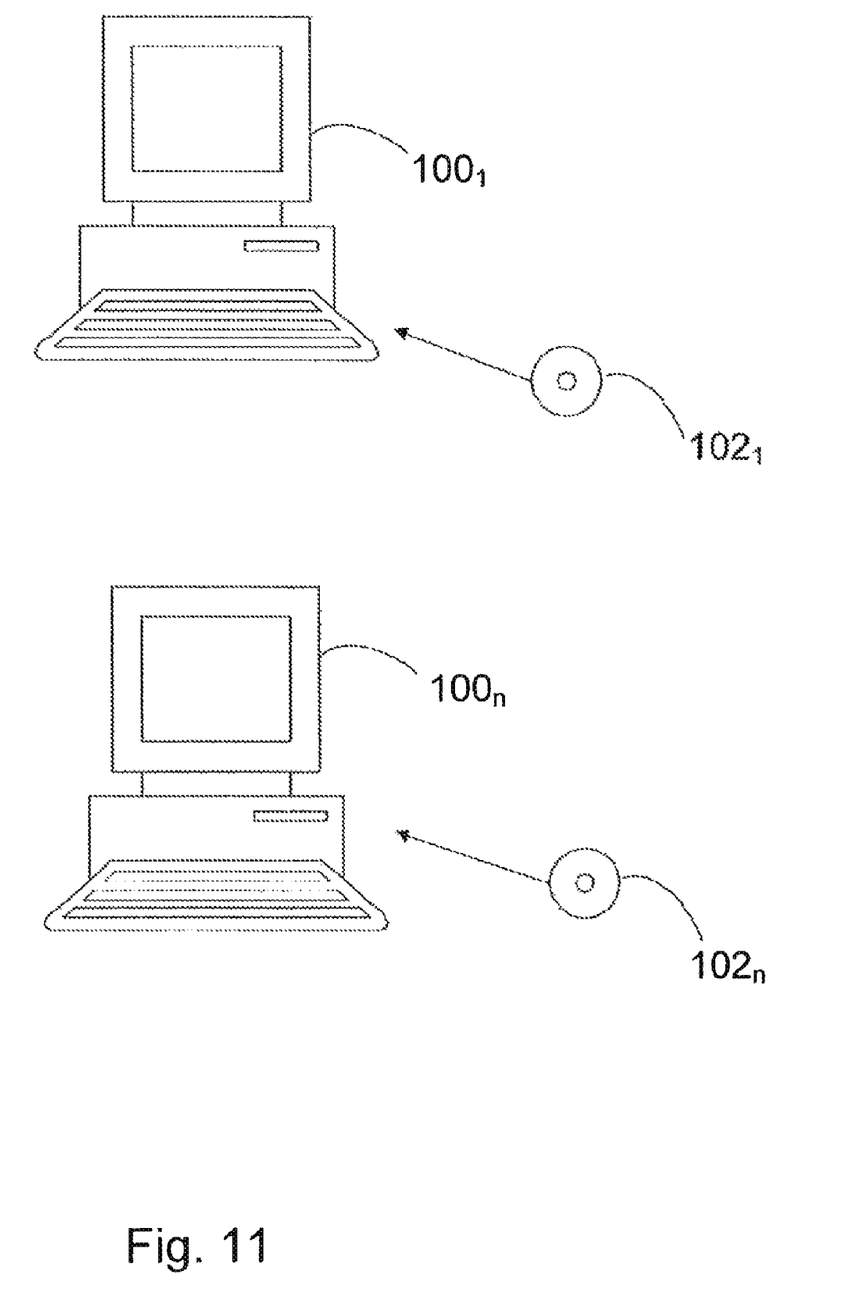
FIG. 11 schematically shows a number of computer program products according to the present invention.

In FIG. 11, some computer program products $102_1, \ldots, 102_n$ according to the present invention are schematically shown. In FIG. 11, n different digital computers $100_1, \ldots, 100_n$ are shown, where n is an integer. In FIG. 11, n different computer program products $102_1, \ldots, 102_n$ are shown, here shown in the form of CD discs. The different computer program products $102_1, \ldots, 102_n$ are directly loadable into the internal memory of the n different computers $100_1, \ldots, 100_n$. Each computer program product $102_1, \ldots, 102_n$ comprises software code portions for executing a part or all the steps according to claim 1 when the product/products $102_1, \ldots, 102_n$ is/are run on the computers $100_1, \ldots, 100_n$. The computer program products $102_1, \ldots, 102_n$ may, for instance, be in the form of diskettes, RAM discs, magnetic tapes, magneto-optical discs or some other suitable products.

The invention is not limited to the described embodiments. It will be evident for those skilled in the art that many different modifications are feasible within the scope of the following Claims.

The invention claimed is:

1. A method of controlling a cooling unit in order to decrease thermal load on an animal located within a barn, the method comprising the steps of:
    with a first temperature sensor, a computerized control unit determining whether a first air temperature is greater than a first threshold value, wherein the first air temperature is representative of barn temperature as a whole;
    with a second temperature sensor, the computerized control unit determining whether a parameter, dependent on a second temperature local to the animal, is greater than a second threshold value, wherein the second temperature sensor is located to measure the second temperature as one of i) temperature in an vicinity of an animal, ii) temperature in an area that houses plural animals at a time, iii) temperature in an area that houses only one animal at a time, and iv) temperature of one individual animal;
    when the determined first air temperature is greater than the first threshold value, the computerized control unit starting the cooling unit to cool to lower the first air temperature within the barn; and
    when the parameter being greater than the second threshold value, the computerized control unit starting the cooling unit to cool and thereby lower the second temperature.

2. A method of claim 1, wherein,
    when i) the determined first air temperature is not greater than the first threshold value, and ii) the parameter is greater than the second threshold value, are both satisfied, the computerized control unit starts the cooling unit to cool and thereby lower the second temperature.

3. A method of claim 1, comprising the further steps of:
    detecting when an animal is in a milking parlour; and
    the computerized control unit starting the cooling unit when the animal has been detected in the milking parlour.

4. A method of claim 1, comprising the further steps of:
    detecting when an animal is in an animal feeding parlour; and
    the computerized control unit starting the cooling unit when the animal has been detected in the feeding parlour.

5. A method of claim 1, wherein the area that houses only one animal at a time is an animal milking parlour.

6. A method of claim 1, wherein,
    wherein the second temperature sensor is located to measure one of i) ambient temperature in the vicinity of the one individual animal, ii) temperature of the one individual animal's skin, and iii) temperature of the one individual animal's body.

7. A method of claim 1, wherein,
when i) the determined first air temperature is less than the first threshold value, and ii) the parameter is less than the second threshold value, are both satisfied, stopping the cooling unit to stop cooling.

8. A method of claim 1, wherein,
the parameter comprises the second temperature and relative humidity of air.

9. A method of claim 1, wherein,
the parameter comprises a Temperature Humidity Index.

10. A method of claim 1, wherein,
said step of starting the cooling unit to cool based on the second temperature, further includes adjusting a speed of air from said cooling unit to plural non-zero values in dependence of said second temperature.

11. A method of claim 1, wherein,
in said step of starting the cooling unit when the determined first air temperature is greater than the first threshold value, the cooling unit is configured to cool the barn as a whole; and
in said step of starting the cooling unit, when i) the determined first air temperature is not more than the first threshold value, and ii) the parameter is greater than the second threshold value, are both satisfied, a portion of the cooling unit placed to cool an area local to the animal is started to cool the area local to the animal to thereby lower the second temperature.

12. A control system arranged and configured to decrease the thermal load on animals within a barn, the control system comprising:
a cooling unit;
a first temperature sensor located for determining whether a first air temperature is greater than a first threshold value, wherein the first air temperature is representative of barn temperature as a whole;
a second temperature sensor located for determining whether a parameter, dependent on a second temperature local to the animal, is greater than a second threshold value, wherein the second temperature sensor is located to measure the second temperature as one of i) temperature in a vicinity of an animal, ii) temperature in an area that houses plural animals at a time, iii) temperature in an area that houses only one animal at a time, and iv) temperature of one individual animal;
a control unit i) connected to the first and second temperature sensors, and ii) configured so that
A) when the determined first air temperature is greater than the first threshold value, the control unit starts the cooling unit to cool to lower the first air temperature in the barn; and
B) when the parameter is greater than the second threshold value, the control unit starts the cooling unit to cool and thereby lower the second temperature.

13. A system of claim 12, wherein the second temperature sensor is located to measure the temperature of the one individual animal including measuring at least one of measuring i) temperature of the one animal's skin, and ii) temperature of the one animal's body.

14. A system of claim 12, wherein the second temperature sensor is located to measure the temperature of the animal feeding area.

15. A system of claim 12, wherein the second temperature sensor is located to measure the temperature of the animal resting area.

16. A system of claim 12, wherein the second temperature sensor is located to measure the temperature of the area arranged to place one animal at a time.

17. A system of claim 12, wherein,
the second temperature sensor is located to measure the second temperature as ambient temperature in a vicinity of the one animal.

18. A system of claim 12, wherein,
the control unit is configured so that when i) the determined first air temperature is less than the first threshold value, and ii) the parameter is less than the second threshold value, are both satisfied, the control unit stops the cooling unit to stop cooling.

19. A system of claim 12, wherein,
the parameter comprises the second temperature and relative humidity of air.

20. A system of claim 12, wherein,
the parameter comprises a Temperature Humidity Index.

21. A system of claim 12, wherein,
the cooling unit is configured to cool the barn as a whole, and the control unit is configured so that starting the cooling unit when the determined first air temperature is greater than the first threshold value, the cooling unit cools the barn as a whole; and
the cooling unit is configured to cool an area local to the animal, and the control unit is configured so that starting the cooling unit when the parameter is greater than the second threshold value causes the cooling unit to cool the area local to the animal to thereby lower the second temperature.

22. A non-transitory computer program product containing computer software code portions loadable into an internal memory of a digital computer, the software code portions when executed by the computer causing the computer to perform a method of controlling a cooling unit in order to decrease thermal load on an animal located within a barn, the computer performing the steps of:
with a first temperature sensor, determining whether a first air temperature is greater than a first threshold value, wherein the first air temperature is representative of barn temperature as a whole;
with a second temperature sensor, determining whether a parameter, dependent on a second temperature local to the animal, is greater than a second threshold value, wherein the second temperature sensor is located to measure the second temperature as one of i) temperature in an vicinity of an animal, ii) temperature in an area that houses plural animals at a time, iii) temperature in an area that houses only one animal at a time, and iv) temperature of one individual animal;
when the determined first air temperature is greater than the first threshold value, starting the cooling unit to cool to lower the first air temperature; and
when the parameter being greater than the second threshold value, starting the cooling unit to cool and lower the second temperature.

23. A non-transitory computer program product of claim 22, wherein the software code portions when executed by the computer further causes the computer to perform so that:
when i) the determined first air temperature is less than the first threshold value, and ii) the parameter is less than the second threshold value, are both satisfied, the control unit stops the cooling unit to stop cooling.

* * * * *